(12) United States Patent
Takeshita et al.

(10) Patent No.: US 9,609,401 B2
(45) Date of Patent: Mar. 28, 2017

(54) OPTICAL SWITCH, OPTICAL TRANSMISSION DEVICE, AND OPTICAL SWITCHING METHOD

(71) Applicant: NEC Corporation, Minato-ku, Tokyo (JP)

(72) Inventors: Hitoshi Takeshita, Tokyo (JP); Ryuichi Ikematsu, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 4 days.

(21) Appl. No.: 14/441,247

(22) PCT Filed: Nov. 12, 2013

(86) PCT No.: PCT/JP2013/006642
§ 371 (c)(1),
(2) Date: May 7, 2015

(87) PCT Pub. No.: WO2014/076936
PCT Pub. Date: May 22, 2014

(65) Prior Publication Data
US 2015/0289036 A1   Oct. 8, 2015

(30) Foreign Application Priority Data

Nov. 15, 2012  (JP) .................. 2012-251146

(51) Int. Cl.
*H04Q 11/00*  (2006.01)
*H04J 14/02*  (2006.01)

(52) U.S. Cl.
CPC ...... *H04Q 11/0005* (2013.01); *H04J 14/0212* (2013.01); *H04Q 2011/0015* (2013.01); *H04Q 2011/0016* (2013.01)

(58) Field of Classification Search
CPC ....... H04Q 11/0005; H04Q 2011/0015; H04Q 2011/0016; H04J 14/0212
(Continued)

(56) References Cited

U.S. PATENT DOCUMENTS 6,192,172 B1 *  2/2001  Fatehi ............... H04Q 11/0005
                                                    385/16
2003/0002106 A1 *  1/2003  Takahashi ............ H04J 14/02
                                                    398/48
(Continued)

FOREIGN PATENT DOCUMENTS

JP          2012-028929 A     2/2012

OTHER PUBLICATIONS

R. A. Jensen, "Optical Switch Architectures for Emerging Colorless/Directionless/Contentionless ROADM Networks", Optical Fiber Communication Conference and Exposition (OFC/NFOEC), 2011 and the National Fiber Optic Engineers Conference, OThR3, pp. 1-3, Mar. 6-10, 2011.
(Continued)

*Primary Examiner* — Dalzid Singh (57) ABSTRACT

It is difficult to increase the number of inputs and outputs of an optical switch supporting CDC functions, therefore, an optical switch according to an exemplary aspect of the present invention includes a unit optical switch inputting n optical signals and outputting n optical signals; an optical splitter inputting a single optical signal, splitting the single optical signal into k optical signals, and outputting the k optical signals; and an optical selector inputting m optical signals and outputting a single optical signal, wherein the optical splitter includes m×n pieces, the unit optical switch includes m×k pieces, the optical selector includes n×k pieces, (k×(m×n)) outputs of the optical splitter correspond to (n×(m×k)) inputs of the unit optical switch, (n×(m×k)) outputs of the unit optical switch correspond to (m×(n×k))
(Continued)

inputs of the optical selector, and (n×m) optical signals inputted into the optical splitter are output through the (m×k) unit optical switch from the optical selector as (n×k) optical signals.

15 Claims, 9 Drawing Sheets

(58) Field of Classification Search
USPC .......................................................... 398/48
See application file for complete search history.

(56) References Cited

U.S. PATENT DOCUMENTS

| | | | |
|---|---|---|---|
| 2004/0218921 A1* | 11/2004 | Kuroyanagi | H04J 14/0212 |
| | | | 398/56 |
| 2009/0232497 A1* | 9/2009 | Archambault | H04J 14/0206 |
| | | | 398/50 |
| 2011/0318006 A1* | 12/2011 | Uehara | H04Q 11/0005 |
| | | | 398/50 |
| 2012/0027408 A1* | 2/2012 | Atlas | H04J 14/0204 |
| | | | 398/58 |

OTHER PUBLICATIONS

S. Nakamura, et al., "High extinction ratio optical switching independently of temperature with silicon photonic 1×8 switch", Optical Fiber Communication Conference and Exposition (OFC/NFOEC), 2012 and the National Fiber Optic Engineers Conference, pp. 1-3, Mar. 4-8, 2012.
English Translation for Write opinion of PCT/JP2013/006642.
International Search Report for PCT Application No. PCT/JP2013/006642, mailed on Dec. 24, 2013.

* cited by examiner

OPTICAL SWITCH, OPTICAL TRANSMISSION DEVICE, AND OPTICAL SWITCHING METHOD

This application is a National Stage Entry of PCT/JP2013/006642 filed on Nov. 12, 2013, which claims priority from Japanese Patent Application 2012-251146 filed on Nov. 15, 2012, the contents of all of which are incorporated herein by reference, in their entirety.

TECHNICAL FIELD

The present invention relates to optical switches, optical transmission devices, and optical switching methods, in particular, to an optical switch, an optical transmission device, and an optical switching method in which the number of inputs and outputs is expanded.

BACKGROUND ART

The capacity enlargement of a backbone optical communication network has become a problem in order to deal with an explosive expansion of the information-communication traffic forecast in the future. A variety of approaches have been taken to the problem, and as one of those approaches, the research and development to enlarge the capacity and improve the flexibility of an optical node has been performed.

In order to enlarge the capacity of an optical node, there is a method of enlarging the communication capacity per optical transmission line, that is, optical fiber, and a method of laying an optical fiber itself additionally. The method of enlarging the communication capacity per optical fiber has been realized by a time division multiplexing (TDM) method or a wavelength division multiplexing (WDM) method. The method of laying an optical fiber itself additionally is called a space division multiplexing (SDM) technique.

The communication between user points is performed by connecting the user points by an optical path which is identified by a wavelength or an optical fiber. The optical path is composed of a single optical fiber or a combination of a plurality of optical fibers. When a plurality of optical fibers are combined, the combination is realized by an optical node using a reconfigurable optical add drop multiplexer (ROADM) or the like. That is to say, changing the combination of a plurality of optical fibers dynamically makes it possible to realize the communication between various points. Specifically, such communication is realized by switching connection between an input optical fiber of an ROADM and one of various output optical fibers by using an optical switch which is a component of the ROADM. This is generally called an optical path switching in an ROADM.

In order to enlarge the communication capacity of a network as referred to above, it is believed that there are two methods, that is, a method of enlarging the communication capacity of an optical path itself and a method of increasing the number of optical paths. It is possible to apply the above-mentioned TDM technique in order to enlarge the communication capacity of an optical path itself. In order to increase the number of optical paths, it is possible to apply the above-mentioned WDM technique or SDM technique.

The speeding up of an electrical circuit is necessary for enlarging the communication capacity by the TDM technique. However, the speeding up of an electrical circuit has almost reached a technical limit in recent years, and it becomes difficult to improve it dramatically.

It is necessary for enlarging the communication capacity by the WDM technique to widen the optical communication bandwidth or to decrease the optical bandwidth to be allocated to each optical path. Regarding the optical communication bandwidth, it is not easy to widen the bandwidth because there are limits due to a loss of an optical fiber or an amplification bandwidth of an optical amplifier. Therefore, an approach has been adopted in recent years that dense wavelength multiplexing is performed by decreasing the optical bandwidth used in a single optical path.

On the other hand, it is necessary for enlarging the communication capacity by the SDM technique to lay an optical fiber additionally. The method using the SDM technique is a method for enlarging with most room for enlargement because there is no significant technical issue in the SDM technique unlike the TDM technique or the WDM technique. However, if the fault tolerance is improved by preparing different optical fibers for an active system and a standby system, optical fibers are required up to twice the number of those required actually.

If the communication capacity of a network is enlarged by the SDM technique, it is indispensable to increase the number of optical transceivers and the number of input-output ports of an optical node because of the increase in the number of optical fibers. In order to increase the number of input-output ports of an optical node, it is necessary to increase the number of input-output ports of an optical switch which is a core element of the optical node. For this purpose, it is necessary to combine a plurality of optical switching elements. Therefore, the number of required optical switching elements increases as the number of input-output ports increases. Furthermore, if optical signals are wavelength multiplexed for each input fiber (for each route) toward an optical node, it becomes necessary to perform a switching operation for each wavelength at the optical node. For this reason, it is performed to wavelength demultiplex inputted optical signals and to switch demultiplexed optical signal depending on the wavelength and the route in the optical switch at an optical node. Therefore, the maximum number of input-output ports and the number of optical switching elements required for an optical switch are determined by the number of available routes of the optical node and the wavelength multiplicity number of optical signals. For example, if an ROADM deals with four routes and 80 wavelengths multiplexing, and the add/drop rate is assumed to be 100%, the ROADM requires about two hundred thousand ($\approx(4\times80)\times(4\times80)\times2$) optical switching elements. Since it is not practical to combine no less than about one hundred thousand optical switching elements in terms of physical size, integration utilizing a planar lightwave circuit (PLC) technique is carried out.

As mentioned above, a technique to improve the flexibility of an optical node is known as another approach for enlarging the capacity of the backbone optical communication network. The optical path at the optical node is switched depending on the wavelength and the route. In order to improve the flexibility of the optical node, it is necessary that an optical path having an arbitrary input wavelength and an arbitrary route can be connected to an arbitrary output with non-blocking. In recent years, the research and development of a CDC-ROADM technique has been performed as a technique to realize the above, and an example of the technique is described in Non Patent Literature 1. CDC stands for "Colorless", "Directionless", and "Contentionless". "Colorless" means a function of making it possible to input an optical signal with an arbitrary wavelength into an arbitrary input port of an ROADM, and to output an optical signal with an arbitrary wavelength from an arbitrary output port. "Directionless" means a function of making it possible to guide an input optical signal to an arbitrary route. "Contentionless" means a function of avoiding collision with optical signals having the same wavelength in an ROADM. That is to say, "CDC" function means a function of making it possible to connect an optical signal from an arbitrary input port to an arbitrary output port without conflict over an input port and an input wavelength, without re-configuration, and with non-blocking.

As mentioned above, in order to build a large-capacity and flexible optical communication network, it has made progress in recent years to enable an optical node to have multi-routes and CDC functions. It has been developed to increase the number of input-output ports of an integrated optical switch supporting CDC functions, that is, to enlarge its scale.

Non Patent Literature 2 describes an example of the optical switch supporting CDC functions. The related optical switch described in Non Patent Literature 2 has a configuration obtained by combining, in a tree-shaped structure, waveguide optical switching elements, each of which has one input port and two output ports and is a split-and-select type optical switching (SS optical switching) element. That is to say, the SS optical switching element having one input port and two output ports (1×2) structure performs a switching operation of optical signals by splitting input light into two light beams and selecting one of the split light beams.

A multi-stage connection of SS optical switching elements makes it possible to realize a 1×N optical switch (where N is a natural number more than one: N≥2). Connecting M pieces of 1×N SS optical switches in parallel (where M is a natural number more than one: M≥2) makes it possible to realize an N×M SS optical switch. With respect to the number of optical switching elements, it results in integrating optical switching elements equal to or more than 100 to configure an 8×8 SS optical switch by connecting eight pieces of 1×8 switches in parallel, for example.

CITATION LIST

Non Patent Literature

[NPL 1]
R. A. Jensen, "Optical Switch Architectures for Emerging Colorless/Directionless/Contentionless ROADM Networks", Optical Fiber Communication Conference and Exposition (OFC/NFOEC), 2011 and the National Fiber Optic Engineers Conference, OThR3, pp. 1-3, 6-10 Mar. 2011
[NPL 2]
S. Nakamura, et al., "High extinction ratio optical switching independently of temperature with silicon photonic 1×8 switch", Optical Fiber Communication Conference and Exposition (OFC/NFOEC), 2012 and the National Fiber Optic Engineers Conference, pp. 1-3, 4-8 Mar. 2012

SUMMARY OF INVENTION

Technical Problem

However, it is technically difficult to enlarge the scale of an optical node using above-mentioned related optical switch supporting CDC (Colorless Directionless, Contentionless) functions. The reason is as follows. Since the optical intensity decreases by half every time an optical signal passes through the related optical switching element, the passing loss of the related optical switch with 1×N structure becomes 3×log(2, N) [dB] in principle. Here, log(2, N) represents a logarithm of N to base 2. Since the passing loss increases depending on the size of an optical switch, that is, the number of inputs and outputs, it becomes impossible to obtain an optical signal having enough intensity to receive it after passing through the optical switch if the number of inputs and outputs is increased. In an actual device, the passing loss further increases by several dB due to the coupling loss between an optical fiber and an optical switching element, splitting loss, switching loss and the like.

Thus, there has been a problem that it is difficult to increase the number of inputs and outputs of an optical switch supporting CDC (colorless, directionless, and contentionless) functions.

The object of the present invention is to provide an optical switch, an optical transmission device, and an optical switching method that solve the problem mentioned above that it is difficult to increase the number of inputs and outputs of an optical switch supporting CDC functions.

Solution to Problem

An optical switch according to an exemplary aspect of the present invention includes a unit optical switch inputting n optical signals and outputting n optical signals; an optical splitter inputting a single optical signal, splitting the single optical signal into k optical signals, and outputting the k optical signals; and an optical selector inputting m optical signals and outputting a single optical signal, wherein the optical splitter includes m×n pieces, the unit optical switch includes m×k pieces, the optical selector includes n×k pieces, (k×(m×n)) outputs of the optical splitter correspond to (n×(m×k)) inputs of the unit optical switch, (n×(m×k)) outputs of the unit optical switch correspond to (m×(n×k)) inputs of the optical selector, and (n×m) optical signals inputted into the optical splitter are output through the (m×k) unit optical switch from the optical selector as (n×k) optical signals.

An optical switch according to an exemplary aspect of the present invention includes an optical splitter inputting a single optical signal, splitting the single optical signal into k optical signals, and outputting the k optical signals; and a sub optical switch inputting (m×n) optical signals and outputting n optical signals, wherein the optical splitter includes (m×n) pieces, the sub optical switch includes k pieces, k outputs of one of the optical splitter correspond to each input of k sub optical switch, (m×n) inputs of one of the sub optical switch correspond to each output from (m×n) optical splitter, and (n×m) optical signals inputted into the optical splitter are output from the sub optical switch as (n×k) optical signals.

An optical switching method according to an exemplary aspect of the present invention includes outputting (k×(m×n)) optical signals to an input of (m×n) optical signals by performing a step, by m×n times in parallel, of inputting a single optical signal, splitting the single optical signal into k optical signals, and outputting the k optical signals; outputting (n×(m×k)) optical signals by performing a step, to the (k×(m×n)) optical signals by (m×k) times in parallel, of inputting n optical signals and outputting n optical signals; and outputting (n×k) optical signals by performing a step, to the (n×(m×k)) optical signals by (n×k) times in parallel, of inputting m optical signals and outputting one optical signal.

An optical switching method according to an exemplary aspect of the present invention includes outputting (k×(m×n)) optical signals to an input of (m×n) optical signals by performing a step, by (m×n) times in parallel, of inputting a single optical signal, splitting the single optical signal into k optical signals, and outputting the k optical signals; and outputting (k×n) optical signals by performing a step, to the (k×(m×n)) optical signals by k times in parallel, of inputting (m×n) optical signals and outputting n optical signals.

Advantageous Effects of Invention

According to the optical switch, the optical transmission device, and the optical switching method of the present invention, it becomes possible to increase the number of inputs and outputs of an optical switch supporting CDC (colorless, directionless, and contentionless) functions.

DESCRIPTION OF EMBODIMENTS

The exemplary embodiments of the present invention will be described with reference to drawings below.

The First Exemplary Embodiment

Figure 1:
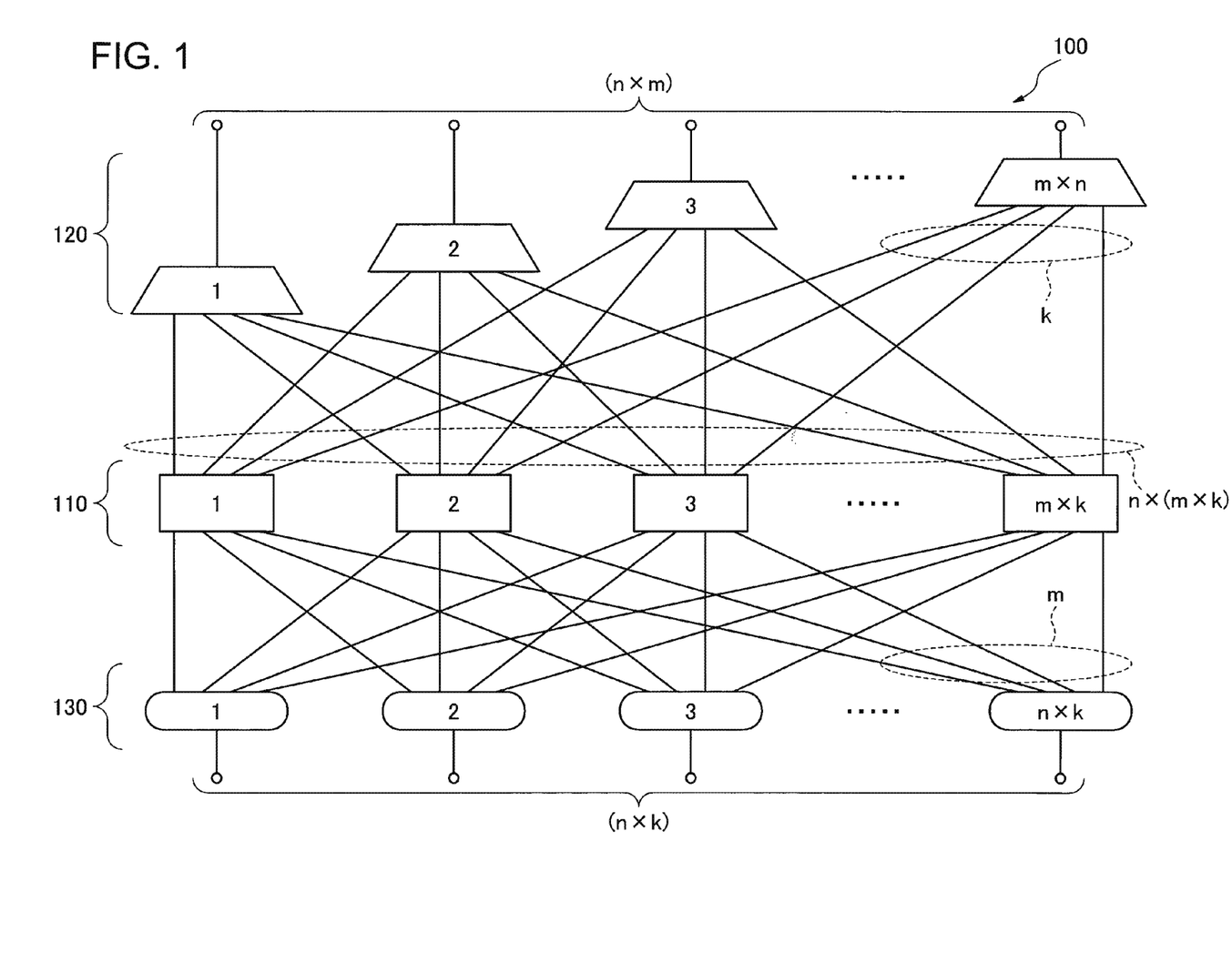
FIG. 1 is a block diagram illustrating a configuration of an optical switch in accordance with the first exemplary embodiment of the present invention.

FIG. 1 is a block diagram illustrating a configuration of an optical switch 100 in accordance with the first exemplary embodiment of the present invention. The optical switch 100 includes a unit optical switch 110 inputting n optical signals and outputting n optical signals, an optical splitter 120 inputting a single optical signal, splitting the single optical signal into k optical signals, and outputting the k optical signals, and an optical selector 130 inputting m optical signals and outputting a single optical signal. Here, n represents a natural number more than one, and m and k represent natural numbers.

The optical switch 100 includes (m×n) optical splitters 120, (m×k) unit optical switches 110, and (n×k) optical selectors 130. The (k×(m×n)) outputs of the optical splitters 120 correspond to the (n×(m×k)) inputs of the unit optical switches 110. The (n×(m×k)) outputs of the unit optical switches 110 correspond to the (m×(n×k)) inputs of the optical selectors 130. The optical switch 100 is configured to output (n×m) optical signals inputted into the optical splitters 120 through the (m×k) unit optical switches 110 from the optical selectors 130 as (n×k) optical signals.

The unit optical switch 110 is configured to be a split-and-select type in which switching elements are connected in multiple-stage, each of which performs a switching operation by splitting input light into two light beams and selecting the split light beams. That is to say, the unit optical switch 110 is a passive element to an input optical signal, and therefore, does not depend on the bit rate or the format of the optical signal passing through it.

According to the optical switch 100 in the first exemplary embodiment, such configuration makes it possible to obtain an optical switch expanded to (n×m) inputs and (n×k) outputs enlarging input ports m times and output ports k times to the unit optical switch 110 having n inputs and n outputs.

Since the optical splitter 120, the unit optical switch 110, and the optical selector 130 which compose the optical switch 100 in accordance with the present exemplary embodiment do not have wavelength dependence, there are no limits in respect of the wavelength bandwidth and the center wavelength of the input optical signal. Therefore, it is not limited by the format or the signal speed of the input optical signal. As a result, it is possible to expand the number of inputs and outputs of the optical switch supporting CDC (colorless, directionless, and contentionless) functions. That is to say, it becomes possible to increase or decrease the number of input-output ports in-service maintaining CDC functions. Here, "CDC" function means a function of making it possible to connect an optical signal from an arbitrary input port to an arbitrary output port without conflict over an input port and an input wavelength, without re-configuration, and with non-blocking.

It is unnecessary in the optical switch 100 in the present exemplary embodiment to be configured to connect the unit optical switches 110 having the largest passing loss of optical signals in multiple-stage in the propagating direction of the optical signal. This makes it possible to reduce the passing loss of the optical signal between inputs and outputs of the optical switch 100. As a result, according to the optical switch 100 in the present exemplary embodiment, it becomes possible to further increase the number of input-output ports as compared with a cross network technique and the like which require connecting unit optical switches in multiple-stage in order to add input-output ports.

For comparison, it will be described to expand the number of input-output ports of an optical switch using a cross network technique. If the cross network technique is used, it is impossible to increase the number of input-output ports maintaining CDC functions by merely combining unit optical switches having one type of number of input-output ports (n×n, for example). That is to say, it is impossible to increase the number of input-output ports maintaining CDC functions which make it possible to connect an optical signal from an arbitrary input port to an arbitrary output port without conflict over an input port and an input wavelength, without re-configuration, and with non-blocking.

Figure 9:
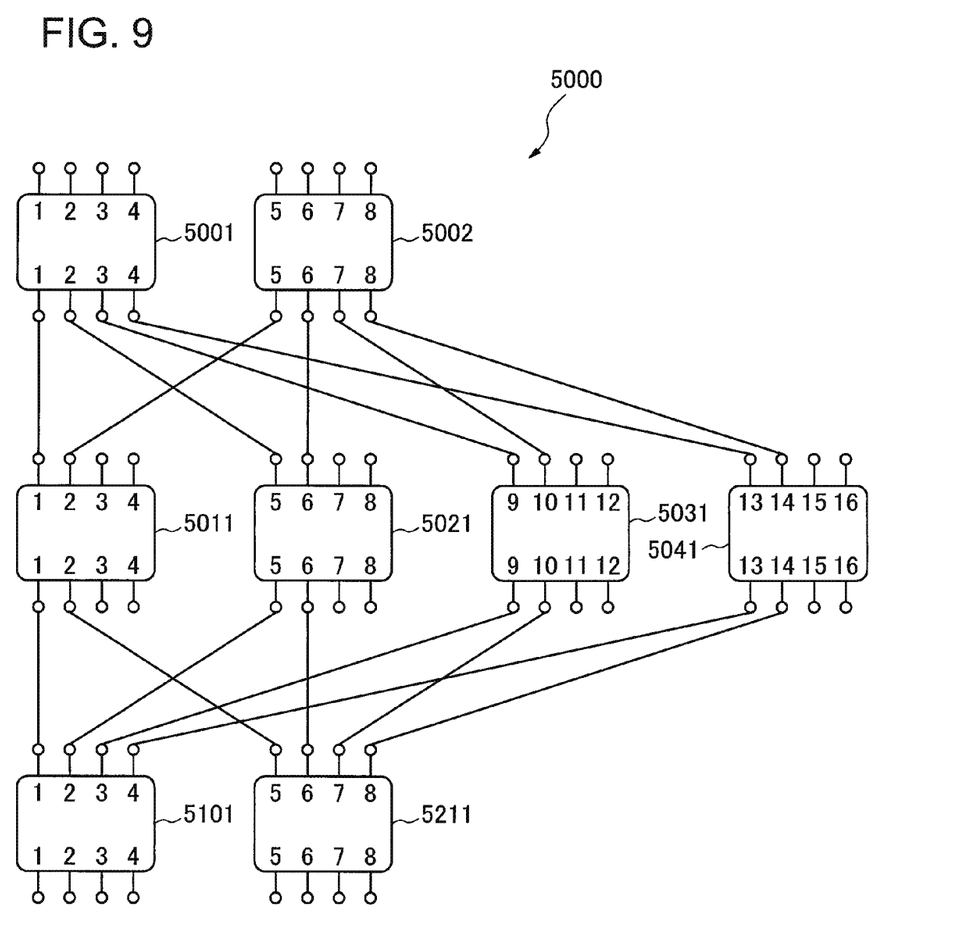
FIG. 9 is a block diagram illustrating a configuration of a related cross network connection optical switch.

FIG. 9 illustrates a configuration of a related cross network connection optical switch. A related cross network connection optical switch 5000 is configured to form a cross network connection using 4×4 optical switches as unit optical switches and to expand it to an 8×8 optical switch. FIG. 9 illustrates a configuration in which two 4×4 optical switches 5001 and 5002 are used in the first stage, four 4×4 optical switches 5011 to 5041 are used in the second stage, and two 4×4 optical switches 5101 and 5211 are used in the third stage. Four 4×4 optical switches are required in the second stage in order to realize a non-blocking configuration.

However, since the optical switches in the second stage only have to function as a 2×2 optical switch, a 4×4 configuration is an excess function. Therefore, the manufacturing cost becomes an excess, and the optical switch also excessively enlarges in physical size. This goes against the practical use. In order to solve the problem, it can be configured to use a unit optical switch having different numbers of input-output ports (n×m, N/n×N/n, or m×n, for example). This case, however, also goes against the practical use because the manufacturing cost increases due to an increase in a variety of unit optical switches. There is a limitation that it is necessary to satisfy the condition of m≥2n−1 in order to maintain CDC functions.

On the other hand, it becomes possible in the optical switch 100 in the present exemplary embodiment to increase the number of input-output ports maintaining CDC functions by using a single type of unit optical switches. In this case, since only one type of unit optical switches is required, it is possible to enhance the cost reduction effect by volume efficiency. As a result, it is possible to keep production cost low on an optical switch even though the number of input-output ports is increased.

As illustrated in FIG. 9, it is necessary in the related cross network connection optical switch 5000 to connect unit optical switches in at least three stages in the propagating direction of an optical signal. On the other hand, as illustrated in FIG. 1, the optical switch 100 in the present exemplary embodiment is configured to dispose the unit optical switches 110 in one stage only in the propagating direction of an optical signal. Therefore, the optical switch 100 in the present exemplary embodiment makes it possible to reduce the passing optical loss to about one-third as compared with the related cross network connection optical switch. Therefore, if the allowable passing optical loss is equalized, the optical switch 100 in the present exemplary embodiment makes it possible to approximately triple the maximum number of extensible input-output ports.

Furthermore, the unit optical switch 110 in the present exemplary embodiment is configured to be a split-and-select type and make it possible to split and distribute an optical signal from a certain input port to all of the output ports and select whether or not it is output with respect to each output port. Therefore, even though any one of the unit optical switches is cut or new one is added, an optical signal is not interrupted between the input-output ports already connected. That is to say, it becomes possible to increase or decrease the number of unit optical switches, namely, the number of input-output ports in-service.

Since the unit optical switch 110 in the present exemplary embodiment is configured by using a plurality of unit optical switches, it is possible to exchange a unit optical switch only at a broken portion and there is no necessity to stop the communication service using unbroken portions. Therefore, it is possible to enhance the continuity of the communication service. On the other hand, in the case of an optical switch composed of a single configuration, if a part of optical switching elements composing the optical switch is broken, it is necessary to stop all communication service and exchange the entire optical switch. In this case, the continuity of the service is remarkably inhibited by needs to stop even the communication service using unbroken portions.

Next, the optical switching method in accordance with the present exemplary embodiment will be described. In the optical switching method of the present exemplary embodiment, first, (k×(m×n)) optical signals are output to an input of (m×n) optical signals by performing a step, by m×n times in parallel, of inputting a single optical signal, splitting the single optical signal into k optical signals, and outputting the k optical signals. Here, n represents a natural number more than one, and m and k represent natural numbers.

And then, (n×(m×k)) optical signals are output by performing a step, to the (k×(m×n)) optical signals by (m×k) times in parallel, of inputting n optical signals and outputting n optical signals. Subsequently, (n×k) optical signals are output by performing a step, to the (n×(m×k)) optical signals by (n×k) times in parallel, of inputting m optical signals and outputting one optical signal.

According to the optical switching method in the present exemplary embodiment, the above-mentioned configuration makes it possible to obtain an optical switching method for increasing the number of input optical signals by m times and the number of output optical signals by k times to a step of inputting n optical signals and outputting n optical signals. In addition, since the optical switching method in the present exemplary embodiment is configured to include a step of splitting an optical signal, it does not depend on the format or the signal speed of the input optical signal. As a result, it is possible to expand the number of inputs and outputs maintaining CDC (colorless, directionless, and contentionless) functions.

The Second Exemplary Embodiment

Figure 2:
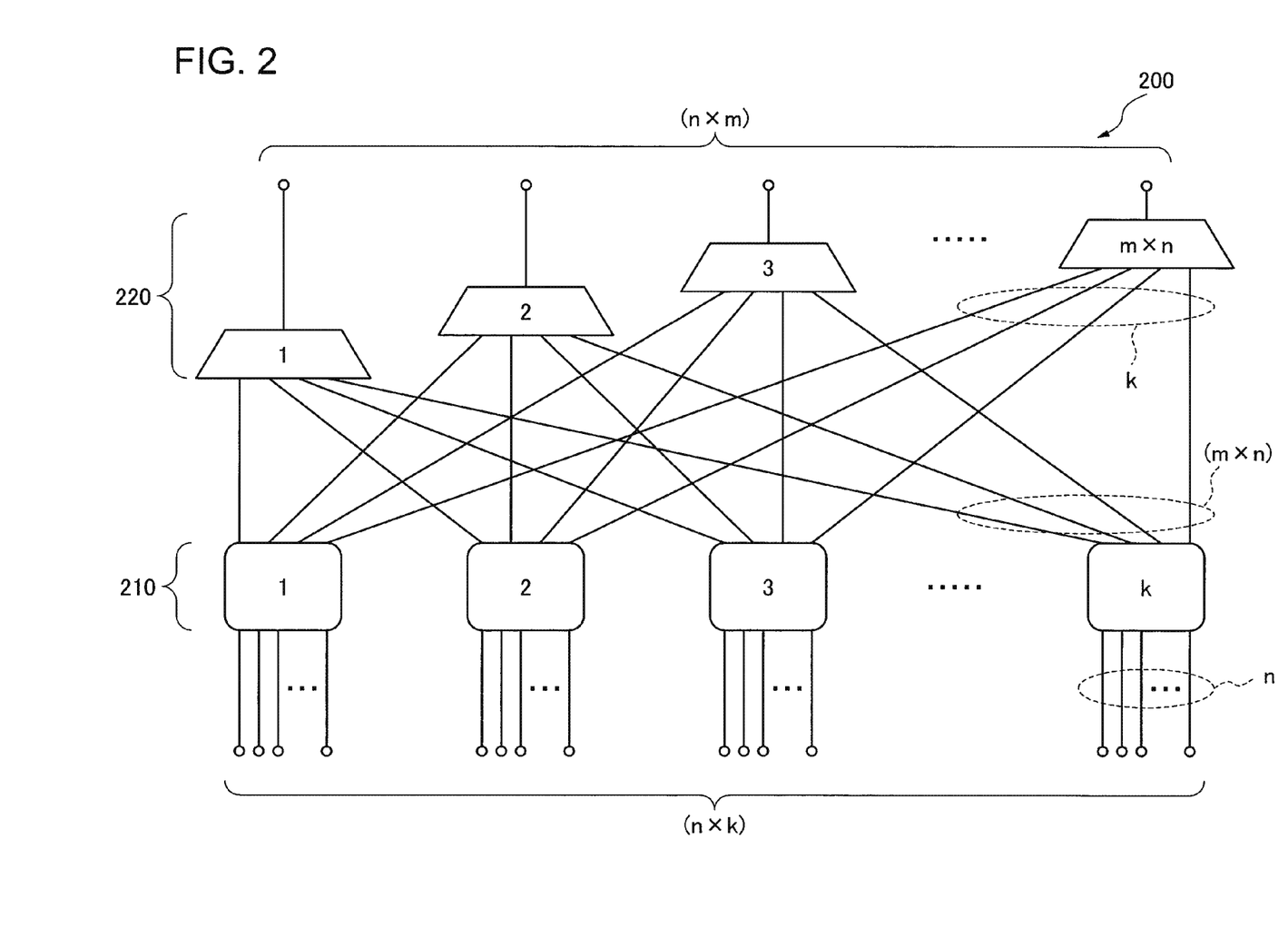
FIG. 2 is a block diagram illustrating a configuration of an optical switch in accordance with the second exemplary embodiment of the present invention.

Next, the second exemplary embodiment of the present invention will be described. FIG. 2 is a block diagram illustrating a configuration of an optical switch 200 in accordance with the second exemplary embodiment of the present invention. The optical switch 200 includes an optical splitter 220 inputting a single optical signal, splitting the single optical signal into k optical signals, and outputting the k optical signals, and a sub optical switch 210 inputting (m×n) optical signals and outputting n optical signals. Here, n represents a natural number more than one, and m and k represent natural numbers.

The optical switch 200 includes (m×n) optical splitters 220 and k sub optical switches 210. The k outputs of one of the optical splitters 220 correspond to each input of k sub optical switches 210. The (m×n) inputs of one of the sub optical switches 210 correspond to each output from (m×n) optical splitters 220. The optical switch 200 is configured to output (n×m) optical signals inputted into the optical splitters 220 from the sub optical switches 210 as (n×k) optical signals.

According to the optical switch 200 in the second exemplary embodiment, such configuration makes it possible to obtain an optical switch expanded to (n×m) inputs and (n×k) outputs enlarging input ports m times and output ports k times.

Figure 3:
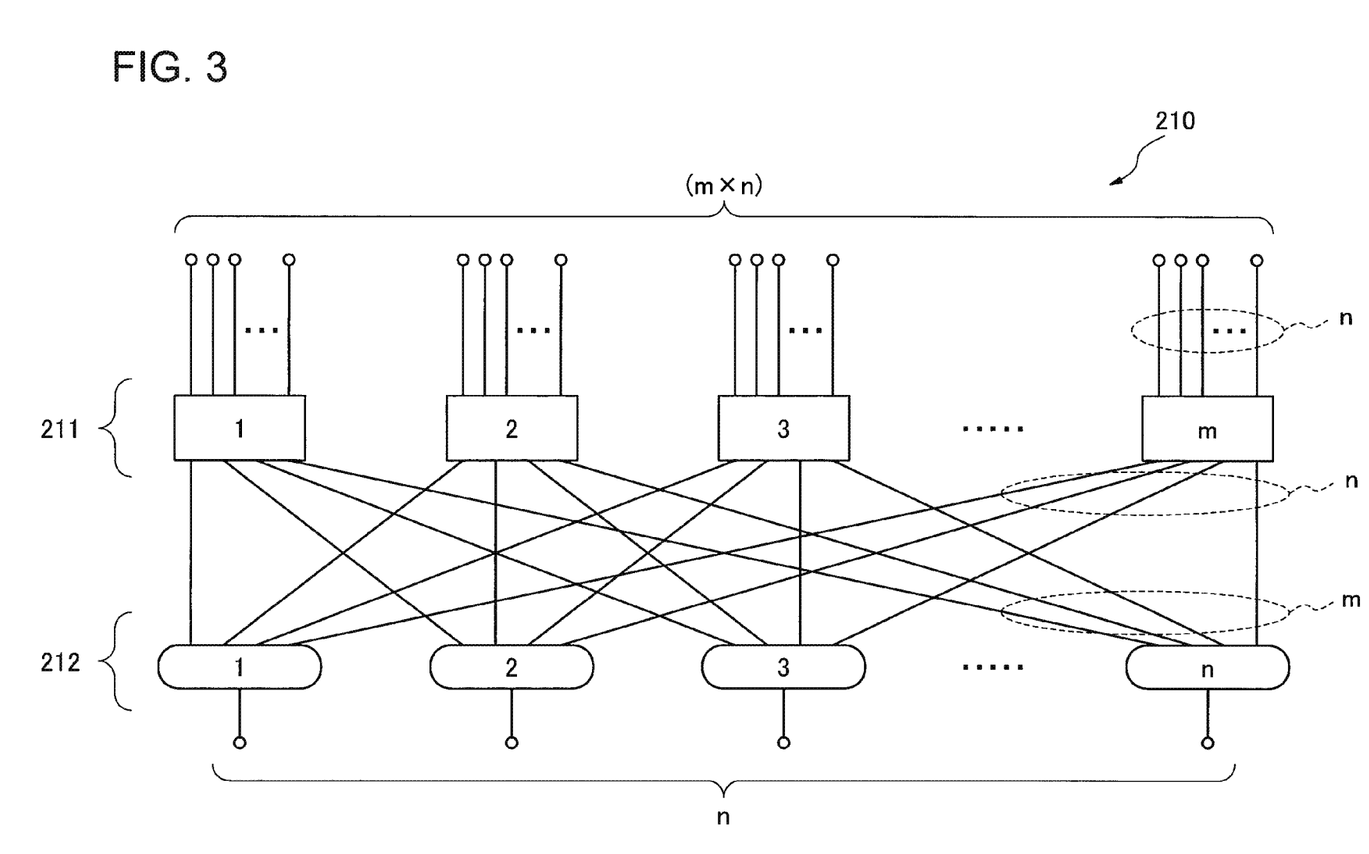
FIG. 3 is a block diagram illustrating a configuration of a part of the optical switch in accordance with the second exemplary embodiment of the present invention.

FIG. 3 illustrates a configuration of one of the sub optical switches 210. The sub optical switch 210 includes a unit optical switch 211 inputting n optical signals and outputting n optical signals, and an optical selector 212 inputting m optical signals and outputting one optical signal.

The sub optical switch 210 includes m unit optical switches 211 and n optical selectors 212. The m inputs of one of the optical selectors 212 correspond to each output from the m unit optical switches 211. The n outputs from one of the unit optical switches 211 correspond to each input of n optical selectors 212. The sub optical switch 210 is configured to output (m×n) optical signals inputted into the unit optical switches 211 from the optical selectors 212 as n optical signals.

The unit optical switch 211 is configured to be a split-and-select type in which switching elements are connected in multiple-stage, each of which performs a switching operation by splitting input light into two light beams and selecting the split light beams. That is to say, the unit optical switch 211 is a passive element to an input optical signal, and therefore, does not depend on the bit rate or the format of the optical signal passing through it.

Since the optical splitter 220, the unit optical switch 211, and the optical selector 212 which compose the optical switch 200 in accordance with the present exemplary embodiment do not have wavelength dependence, there are no limits in respect of the wavelength bandwidth and the center wavelength of the input optical signal. Therefore, it is not limited by the format or the signal speed of the input optical signal. As a result, it is possible to expand the number of inputs and outputs of the optical switch supporting CDC (colorless, directionless, and contentionless) functions. That is to say, it becomes possible to increase or decrease the number of input-output ports in-service maintaining CDC functions. Here, "CDC" function means a function of making it possible to connect an optical signal from an arbitrary input port to an arbitrary output port without conflict over an input port and an input wavelength, without re-configuration, and with non-blocking.

According to the optical switch 200 in the present exemplary embodiment, it is possible to increase the number of input-output ports without connecting the unit optical switches 211 having a large passing optical loss in multiple-stage. Therefore, it is possible to reduce the passing optical loss as compared with the related cross network connection optical switch configured to connect unit optical switches in multiple-stage. As a result, it is possible to increase the number of input-output ports.

The optical switch 200 in the present exemplary embodiment makes it possible to be a scalable configuration that the configuration of the optical switch 200 can be determined if the number of input-output ports of the unit optical switch 211, the expansion ratio of input ports, and the expansion ratio of output ports are defined. That is to say, it is possible to determine by a simple calculation the number of unit optical switches 211 to be required, the number of optical splitters 220 and their split number, and the number of optical selectors 212 and their split number.

Next, the optical switching method in accordance with the present exemplary embodiment will be described. In the optical switching method of the present exemplary embodiment, first, (k×(m×n)) optical signals are output to an input of (m×n) optical signals by performing a step, by m×n times in parallel, of inputting a single optical signal, splitting the single optical signal into k optical signals, and outputting the k optical signals. Here, n represents a natural number more than one, and m and k represent natural numbers.

And then, (k×n) optical signals are output by performing a step, to the (k×(m×n)) optical signals by k times in parallel, of inputting (m×n) optical signals and outputting n optical signals.

According to the optical switching method in the present exemplary embodiment, the above-mentioned configuration makes it possible to obtain an optical switching method for increasing the number of input optical signals by m times and the number of output optical signals by k times to a step of inputting n optical signals and outputting n optical signals. In addition, since the optical switching method in the present exemplary embodiment is configured to include a step of splitting an optical signal, it does not depend on the format or the signal speed of the input optical signal. As a result, it is possible to expand the number of inputs and outputs maintaining CDC (colorless, directionless, and contentionless) functions.

The Third Exemplary Embodiment

Figure 4:
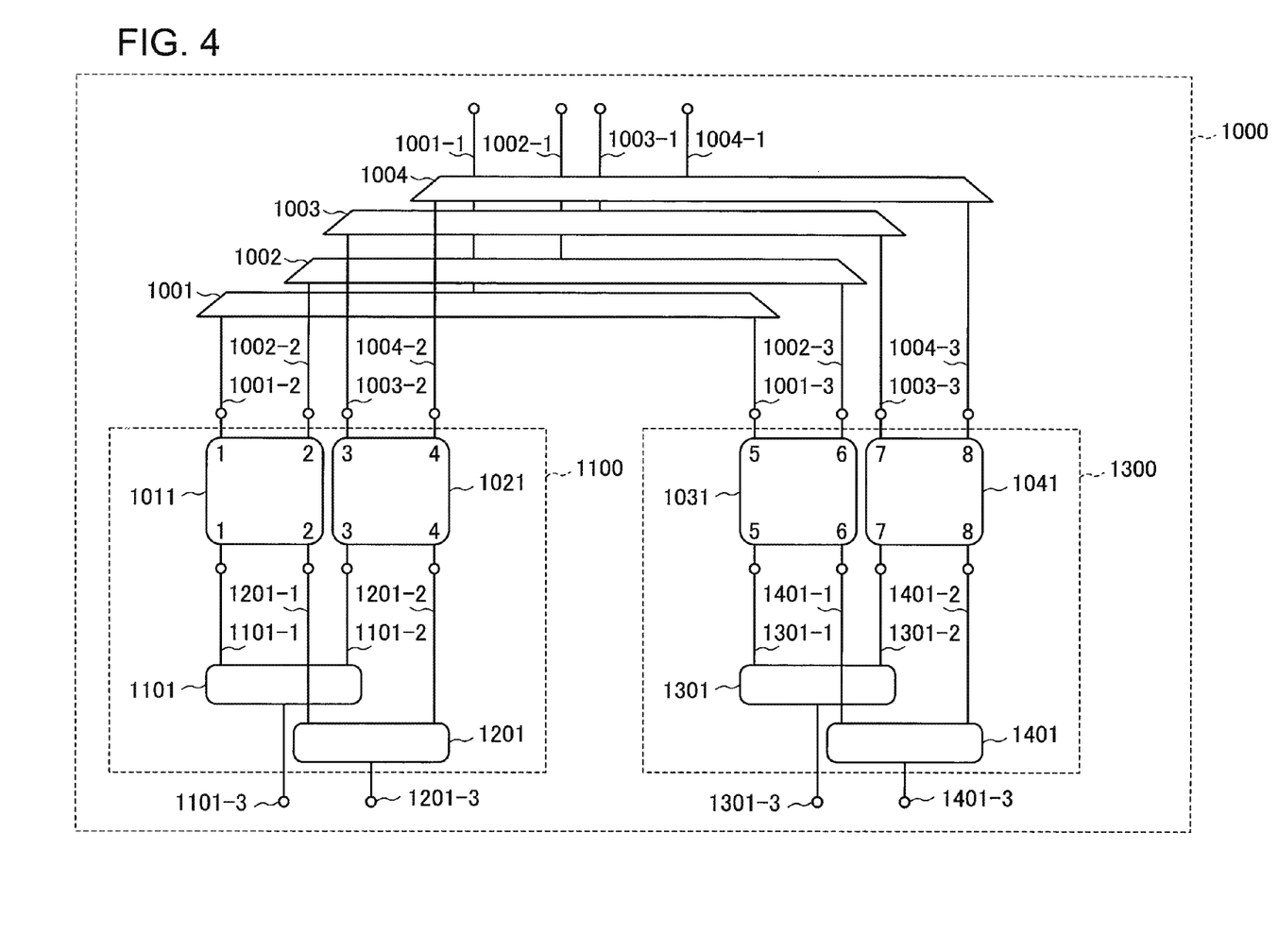
FIG. 4 is a block diagram illustrating a configuration of an optical switch in accordance with the third exemplary embodiment of the present invention.

Next, the third exemplary embodiment of the present invention will be described. FIG. 4 is a block diagram illustrating a configuration of an optical switch 1000 in accordance with the third exemplary embodiment of the present invention. The optical switch 1000 includes four unit optical switches each of which has a 2-input and 2-output (2×2) configuration, four optical splitters each of which has a 1-input and 2-output (1×2) configuration, and four optical selectors each of which has a 2-input and 1-output (2×1) configuration.

As illustrated in FIG. 4, optical splitters 1001 and 1002 are connected to split-and-select type unit optical switches (hereinafter, also referred to as "SS optical switches") 1011 and 1031. The output port 1001-2 of the optical splitter 1001 is connected to the input port 1 of the SS optical switch 1011, and the output port 1001-3 is connected to the input port 5 of the SS optical switch 1031. The output port 1002-2 of the optical splitter 1002 is connected to the input port 2 of the SS optical switch 1011, and the output port 1002-3 is connected to the input port 6 of the SS optical switch 1031.

The SS optical switches 1011 and 1031 are connected to optical selectors 1101, 1201, 1301, and 1401. The output port 1 of the SS optical switch 1011 is connected to the input port 1101-1 of the optical selector 1101, and the output port 2 is connected to the input port 1201-1 of the optical selector 1201. The output port 5 of the SS optical switch 1031 is connected to the input port 1301-1 of the optical selector 1301, and the output port 6 is connected to the input port 1401-1 of the optical selector 1401.

The optical splitters 1003 and 1004, and SS optical switches 1021 and 1041 are connected as is the case with the above. The SS optical switches 1021 and 1041, and the optical selectors 1201 and 1401 are connected as is the case with the above.

As mentioned above, the optical switch 1000, configured to use four 1×2 optical splitters, four 2×2 SS optical switches, and four 2×1 optical selectors, operates as an optical switch expanded to 4×4 configuration as a whole. That is to say, it becomes a configuration for the number of input ports to be doubled and for the number of output ports to be doubled in an SS optical switch with a 2×2 configuration. The reason is that it is possible to connect any one of the four input ports of the optical splitters to an output port of the four 2×1 optical selectors.

Here, it is possible to connect them without conflict over an input port and an input wavelength, without re-configuration, and with non-blocking. This means that a 4×4 expanded optical switch has CDC (colorless, directionless, and contentionless) functions. In addition, since the optical splitters 1001 and 1002, the unit optical switches 1011 to 1041, and the optical selectors 1101 to 1401 do not have wavelength dependence, there are no limits in respect of the wavelength bandwidth and the center wavelength of the input optical signal. Therefore, the format and the speed of the input optical signal are not limited.

Next, the operation of the optical switch 1000 in accordance with the exemplary embodiment will be described. The optical signal inputted into the input port 1001-1 of the optical splitter 1001 is split into two light beams, which are output from the output ports 1001-2 and 1001-3, and then, inputted into the input port 1 of the SS optical switch 1011 and into the input port 5 of the SS optical switch 1031, respectively. The optical signal inputted into the input port 1 of the SS optical switch 1011 is switched to the output port 1 or the output port 2 in the SS optical switch 1011. It is inputted into the optical selector 1101 if it is switched to the output port 1 of the SS optical switch 1011, and it is inputted into the optical selector 1201 if it is switched to the output port 2.

The optical selector 1101 can select one of the optical signal inputted into the input port 1101-1 of the optical selector 1101 from the optical switch 1011 and the optical signal similarly inputted into the input port 1101-2 of the optical selector 1101 from the input port 1003-1 of the optical splitter 1003. If it is switched to the output port 2 of the SS optical switch 1011, it is possible to output it from the output port 1201-3 of the optical selector 1201 similarly.

The split optical signal output to the output port 1001-3 of the optical splitter 1001 can be output by similar operations from the output port 1301-3 of the optical selector 1301 or the output port 1401-3 of the optical selector 1401.

Therefore, it becomes possible to switch the optical signal inputted from the input port 1001-1 of the 4×4 expanded optical switch and output it from any one of the output ports 1101-3, 1201-3, 1301-3, and 1401-3. The 4×4 expanded optical switch operating like this can switch optical signals from an arbitrary input port to an arbitrary output port without conflict over an input port and an input wavelength, without re-configuration, and with non-blocking. That is to say, the 4×4 expanded optical switch has CDC functions. In addition, there are no limits in respect of the wavelength bandwidth and the center wavelength of the input optical signal, and the format and the speed of the input optical signal are not limited.

Next, a configuration example of a case will be described in which the optical switch 1000 in the present exemplary embodiment is applied to an optical network. Unit optical switches are disposed in pairs for an active system and a standby system in the optical network. In this configuration, it is configured to set the same path for the unit optical switch in the active system and the unit optical switch in the standby system, and to select the optical path set for the unit optical switch in the active system by an optical selector during a normal operation.

The intensity of an optical signal at the output port of the unit optical switch is monitored during the operation. If the output intensity of the optical signal from the output port for which the optical path of the unit optical switch in the active system is set, does not reach a predetermined threshold value, it is judged that the unit optical switch in the active system is broken down. In this case, the optical path set for the unit optical switch in the standby system is selected by the optical selector. This makes it possible to recover from fault, enhance fault resistance of the optical switch, and improve reliability of it. In addition, since a broken unit optical switch can be replaced in-service according to the present exemplary embodiment, it is possible to recover from fault of an optical switch in a short time.

The optical switch in the present exemplary embodiment is configured to include a plurality of unit optical switches. Therefore, since it is only necessary to replace the unit optical switches at a broken part only, it is possible to reduce the repair cost. As a result, it is possible to make the operational costs of the optical switch cheaper. In contrast, if an optical switch is composed of a single configuration, it is necessary to replace the whole optical switch if some optical switching elements composing the optical switch break down, and therefore the operational costs become enlarged.

The Fourth Exemplary Embodiment

Figure 5:
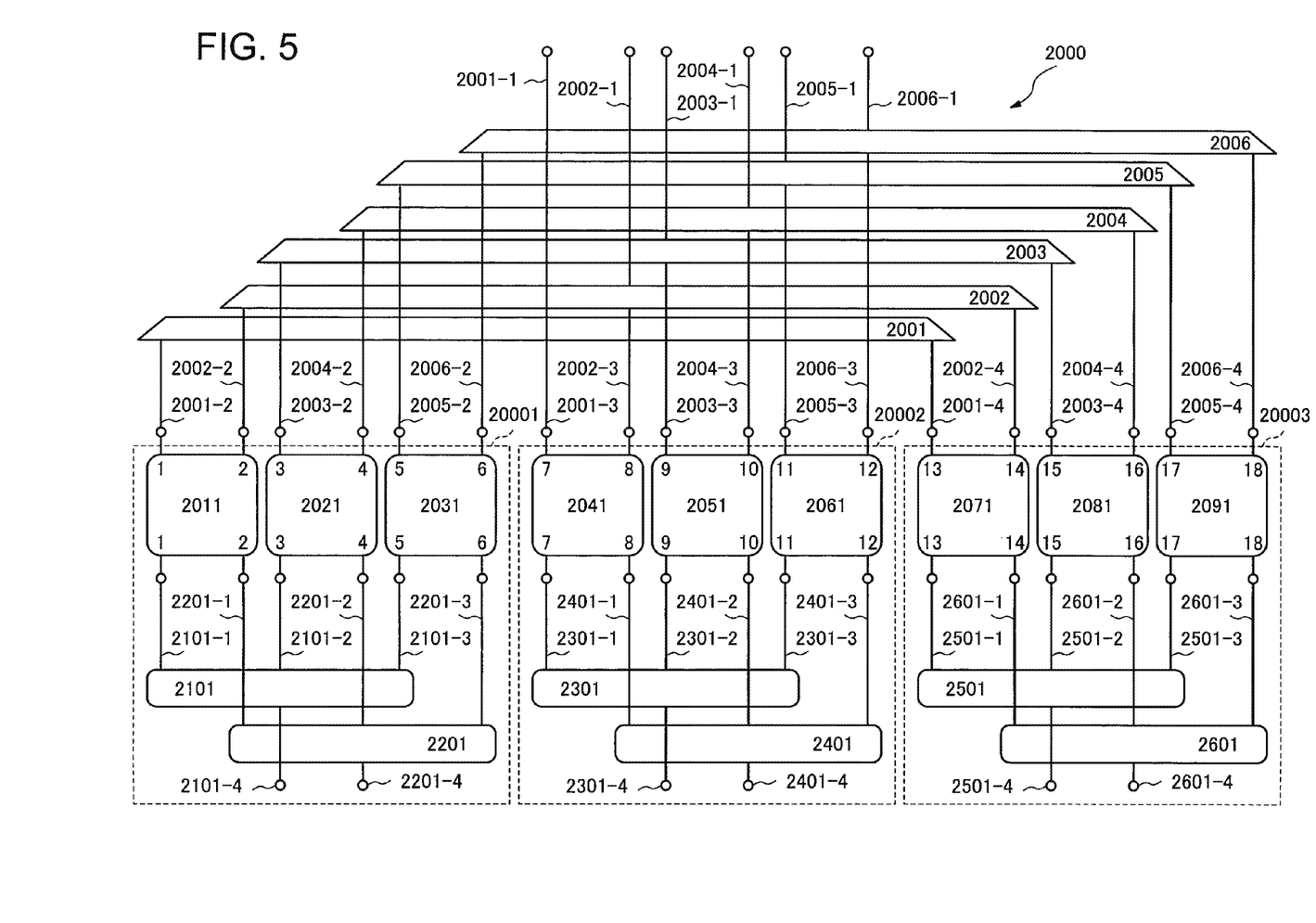
FIG. 5 is a block diagram illustrating a configuration of an optical switch in accordance with the fourth exemplary embodiment of the present invention.

Next, the fourth exemplary embodiment of the present invention will be described. FIG. 5 is a block diagram illustrating a configuration of an optical switch 2000 in accordance with the fourth exemplary embodiment of the present invention. The optical switch 2000 includes nine unit optical switches (SS optical switches) each of which has a 2-input and 2-output (2×2) configuration, six optical splitters each of which has a 1-input and 3-output (1×3) configuration, and six optical selectors each of which has a 3-input and 1-output (3×1) configuration. The optical switch 2000 composes a 6×6 expanded optical switch in which the number of input ports of an SS optical switch having a 2×2 configuration is enlarged three times and the number of output ports is enlarged three times.

Next, the configuration of the optical switch 2000 in the present exemplary embodiment will be described in detail. The description of a portion similar to a configuration of the optical switch 1000 in the third exemplary embodiment will be omitted.

First, a 6×2 expanded optical switch will be described which is configured by enlarging the number of input ports three times, and then, a 6×6 expanded optical will be described which is configured finally by enlarging the number of output ports three times.

At least three 2×2 SS optical switches are required in order to enlarge the number of input ports three times using 2×2 SS optical switches. In this case, the number of input ports is larger than the number of output ports, and an optical selector is required on the output side of the 2×2 SS optical switch in order to minimize the optical loss and avoid it that a plurality of optical signals are output simultaneously from the same port. Since the number of 2×2 SS optical switches is three and the number of output ports is two, two 3×1 optical selectors are required.

Three 2×2 SS optical switches are connected to two 3×1 optical selectors as illustrated in FIG. 5. That is to say, the output port 1 of a 2×2 SS optical switch 2011 is connected to the input port 2101-1 of a 3×1 optical selector 2101. The output port 3 of a 2×2 SS optical switch 2021 is connected to the input port 2101-2 of the 3×1 optical selector 2101, and the output port 5 of a 2×2 SS optical switch 2031 is connected to the input port 2101-3 of the 3×1 optical selector 2101. The same connection is performed with a 3×1 optical selector 2201. The configuration with such connection makes it possible to realize a 6×2 expanded optical switch 20001 composed of the 2×2 SS optical switches 2011, 2021, and 2031, and the 3×1 optical selectors 2101 and 2201, with the number of input ports enlarged three times. Here, the 6×2 expanded optical switch 20001 is configured without connecting 2×2 SS optical switches (unit optical switches) in multiple-stage in the propagating direction of the optical signal. The 6×2 expanded optical switch 20001 configured in this manner can switch optical signals from an arbitrary input port to an arbitrary output port without conflict over an input port and an input wavelength, without re-configuration, and with non-blocking. That is to say, the 6×2 expanded optical switch 20001 has CDC functions.

Next, a 6×6 expanded optical switch will be described which is configured by enlarging the number of output ports three times using the above-mentioned 6×2 expanded optical switch 20001. It is only necessary to use three 6×2 expanded optical switches configured as mentioned above in order to enlarge the number of output ports three times. In this case, in order to enable an arbitrary optical signal to pass through the three 6×2 expanded optical switches, it is only necessary to split the input optical signal using a 1×3 optical splitter into three light beams, each of which to connect to each of the 6×2 expanded optical switches. It is impossible to use an optical selector instead of the optical splitter in order to maintain CDC functions.

As illustrated in FIG. 5, three 6×2 expanded optical switches 20001, 20002, and 20003 are connected to six optical splitters. Specifically, for example, the output port 2001-2 of a 1×3 optical splitter 2001 is connected to the input port 1 of the 2×2 SS optical switch 2011. And it is only necessary to connect the output port 2001-3 of the 1×3 optical splitter 2001 to the input port 7 of a 2×2 SS optical switch 2041, and connect the output port 2001-4 of the 1×3 optical splitter 2001 to the input port 13 of a 2×2 SS optical switch 2071. The same connection with optical splitters 2002 to 2006 makes it possible to enlarge the number of output ports of the 6×2 expanded optical switches three times. Since it is not configured to connect 2×2 SS optical switches in multiple-stage in the propagating direction of the optical signal even though the number of output ports is enlarged, it is possible to reduce the passing optical loss as compared with the related cross network connection optical switch As mentioned above, in the present exemplary embodiment, it has been described in detail to enlarge the number of input ports three times and the number of output ports three times by a configuration using nine 2×2 SS optical switches, six 1×3 optical splitters, and six 3×1 optical selectors. This corresponds to a case in which n=2, m=3, and k=3 in the first exemplary embodiment and the second exemplary embodiment. That is to say, it is possible to enlarge the number of input ports m times and the number of output ports k times by using (m×k) pieces of n×n SS optical switches, (m×n) pieces of 1×k optical splitters, and (n×k) pieces of m×1 optical selectors. Here, n represents a natural number more than one, and m and k represent natural numbers.

The Fifth Exemplary Embodiment

Figure 6:
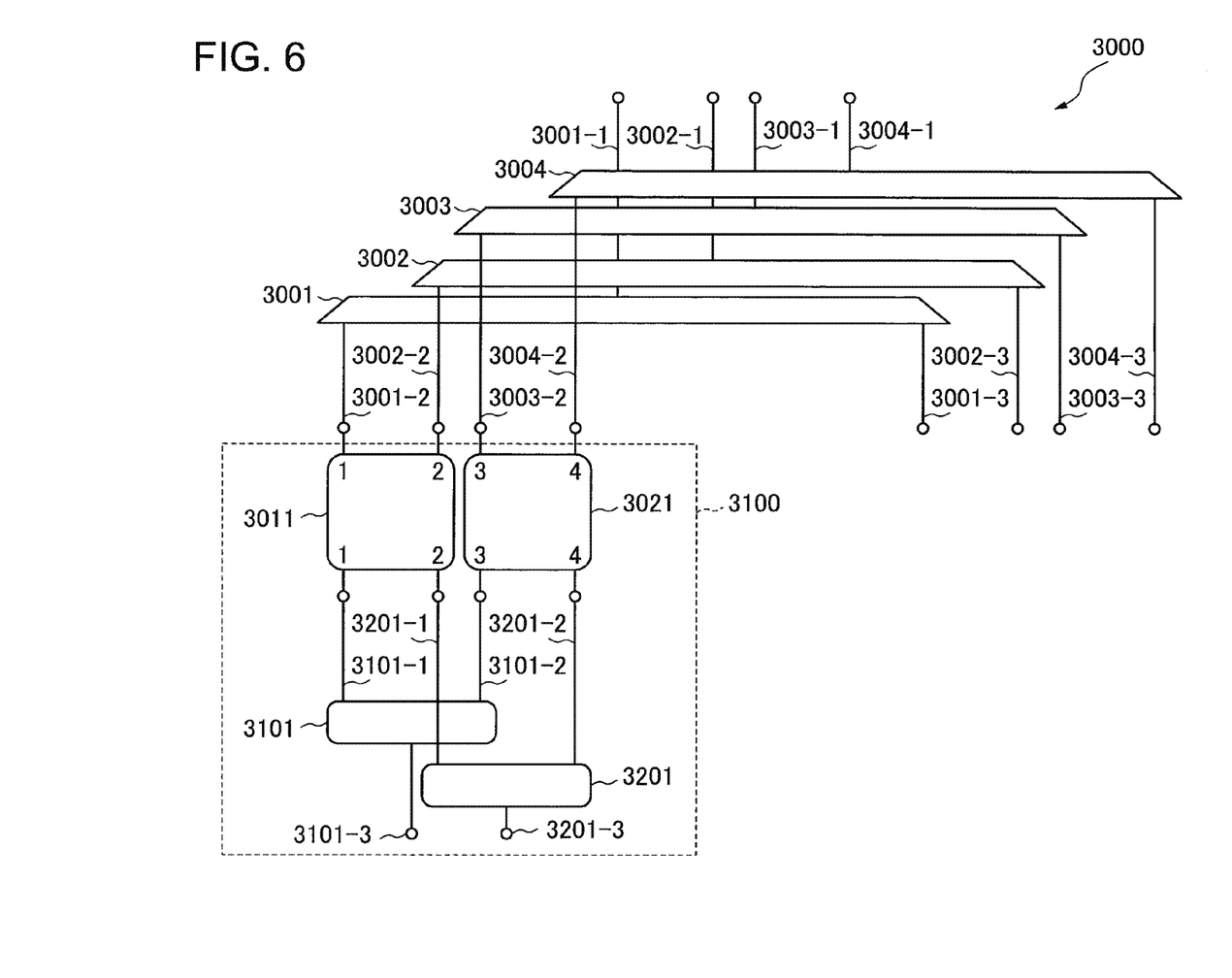
FIG. 6 is a block diagram illustrating a configuration of an optical switch in accordance with the fifth exemplary embodiment of the present invention.

Next, the fifth exemplary embodiment of the present invention will be described. FIG. 6 is a block diagram illustrating a configuration of an optical switch 3000 in accordance with the fifth exemplary embodiment of the present invention. The basic configuration of the optical switch 3000 is similar to that of the optical switch 1000 in the third exemplary embodiment. The optical switch 3000 in the present exemplary embodiment is configured to make it possible to enlarge the number of output ports in-service.

As illustrated in FIG. 6, the optical switch 3000 includes four 1×2 optical splitters 3001 to 3004 and one 4×2 sub optical switch 3100. The 4×2 sub optical switch 3100 includes two 2×2 optical switches 3011, 3021, and two 2×1 optical selectors 3101, 3201. The optical switch 3000 differs from the optical switch 1000 according to the third exemplary embodiment in including unused ports 3001-3 to 3004-3 of the output ports of the 1×2 optical splitters 3001 to 3004. Using the unused ports 3001-3 to 3004-3 enables an extension and output ports to be expanded.

Specifically, for example, the optical switch 3000 can operate as a 4×2 expanded optical switch at the start of the operation. During the operation, a 4×2 sub optical switch configured equally with the 4×2 sub optical switch 3100 is connected to the unused ports 3001-3 to 3004-3. This makes it possible to enlarge the number of output ports twice in-service. As a result, for example, it becomes possible to improve the fault tolerance of the optical switch and enlarge the number of users connectable and the like by laying a standby system additionally in-service.

It becomes possible for invalid optical signals not to be output to the unused ports 3001-3 to 3004-3 by adopting a configuration in which the splitting ratio of the 1×2 optical splitters 3001 to 3004 is variable. This makes it possible to further reduce the passing optical loss.

Specifically, for example, in the 1×2 optical splitters 3001 to 3004, the splitting ratio is set at 1:0 if the output ports 3001-3 to 3004-3 have no connection port and therefore become unused ports. This makes all the optical signals inputted from the input ports 3001-1 to 3004-1 be output from the output ports 3001-2 to 3004-2, and optical signals are not supplied to the output ports 3001-3 to 3004-3.

Next, if an additional 4×2 sub optical switch is connected to the unused port 3001-3 to 3004-3, the splitting ratio of the 1×2 optical splitters 3001 to 3004 is set at 1:1. This makes half of the intensity of the optical signals inputted from the input ports 3001-1 to 3004-1 be output to the output ports 3001-2 to 3004-2, and optical signals with equal intensity be supplied to the output ports 3001-3 to 3004-3 also. In this way, according to the optical switch 3000 in the present exemplary embodiment, the optical intensity inputted into the optical switch 3000 can be reduced before a 4×2 sub optical switch is added, and therefore, it becomes possible to reduce the power consumption of the entire optical network.

Figure 7:
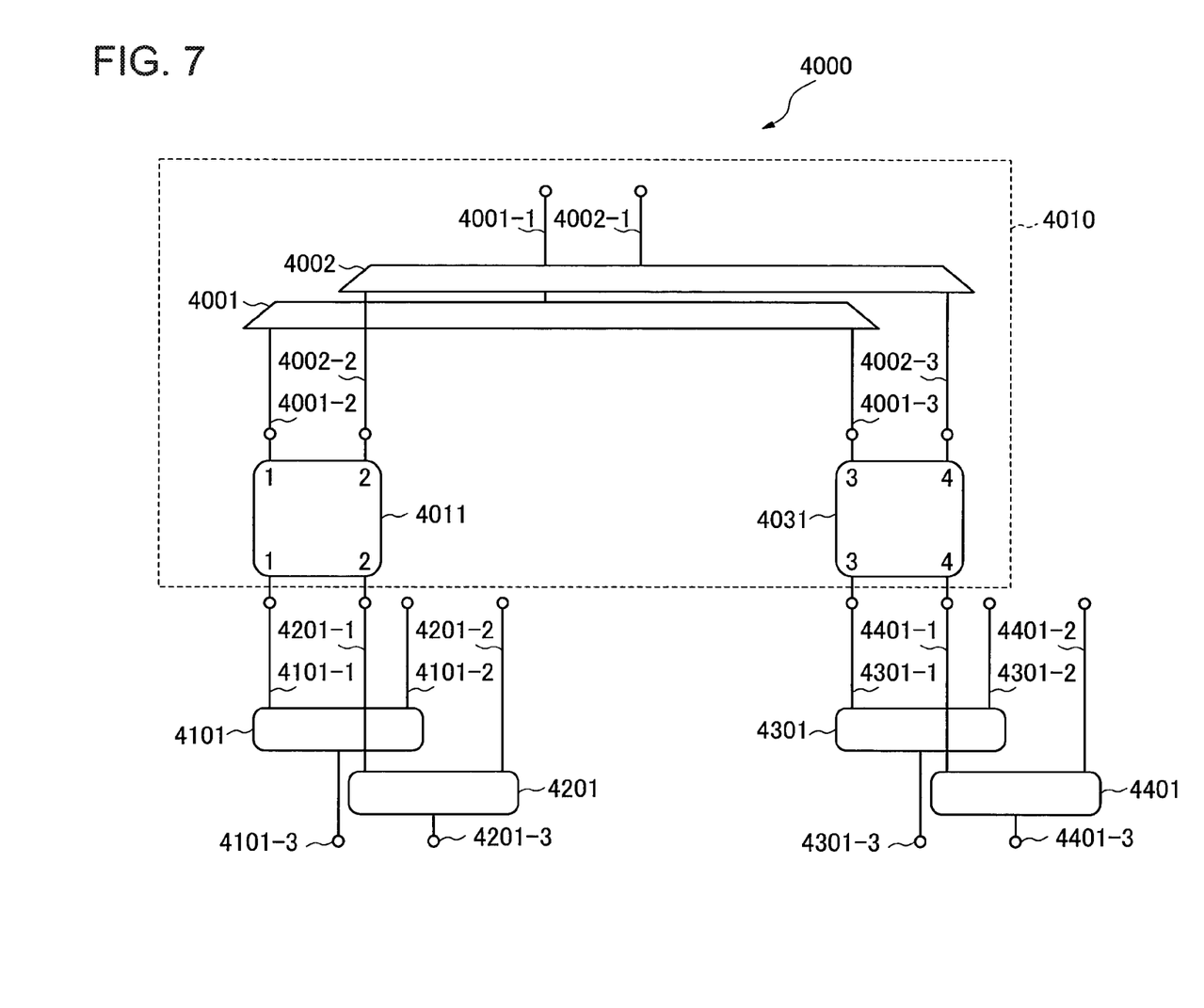
FIG. 7 is a block diagram illustrating another configuration of the optical switch in accordance with the fifth exemplary embodiment of the present invention.

FIG. 7 illustrates an optical switch 4000 having another configuration in accordance with the present exemplary embodiment. The basic configuration of the optical switch 4000 is similar to that of the optical switch 1000 in the third exemplary embodiment. The optical switch 4000 in the present exemplary embodiment is configured to make it possible to enlarge the number of input ports in-service.

As illustrated in FIG. 7, the optical switch 4000 includes one 2×4 sub optical switch 4010 and four 2×1 optical selectors 4101 to 4401. The 2×4 sub optical switch 4010 includes two 2×2 SS optical switches 4011, 4031, and two 1×2 optical splitters 4001, 4002. The optical switch 4000 differs from the optical switch 1000 according to the third exemplary embodiment in including unused ports 4101-2 to 4401-2 of the input ports of the 2×1 optical selectors 4101 to 4401. Using the unused ports 4101-2 to 4401-2 enables an extension and input ports to be expanded.

Specifically, for example, the optical switch 4000 can operate as a 2×4 expanded optical switch at the start of the operation. During the operation, a 2×4 sub optical switch configured equally with the 2×4 sub optical switch 4010 is connected to the unused ports 4101-2 to 4401-2. This makes it possible to enlarge the number of input ports twice in-service. As a result, for example, it becomes possible to improve the fault tolerance of the optical switch by laying a standby system additionally in-service, and enlarge the communication capacity of an optical network by the space division multiplexing.

It has been described above that a 4×2 sub optical switch or a 2×4 sub optical switch is additionally connected to an unused port during the operation. However, it is not limited to this, and it is also acceptable to reduce a 4×2 sub optical switch or a 2×4 sub optical switch during the operation. This makes it possible to decrease the number of input-output ports during the operation.

As mentioned above, the configuration can be adopted that the number of sub optical switches or the number of unit optical switches is variable. That is to say, upgrade is made possible of adding in-service a unit optical switch, an optical splitter, or an optical selector by setting the maximum number of expandable ports and adopting a configuration in which an unused input-output port is included in advance. Since such in-service upgrade is available, it is possible to adopt the following operation method. That is to say, the operation becomes possible of limiting the number of input-output ports to the requisite minimum at introduction time of the optical communication system, and enlarging the number of input-output ports as necessary after having been expected to create a profit due to an increase in the communication capacity. As a result, it is possible to make the cost for introducing an optical switch cheaper.

The Sixth Exemplary Embodiment

Figure 8:
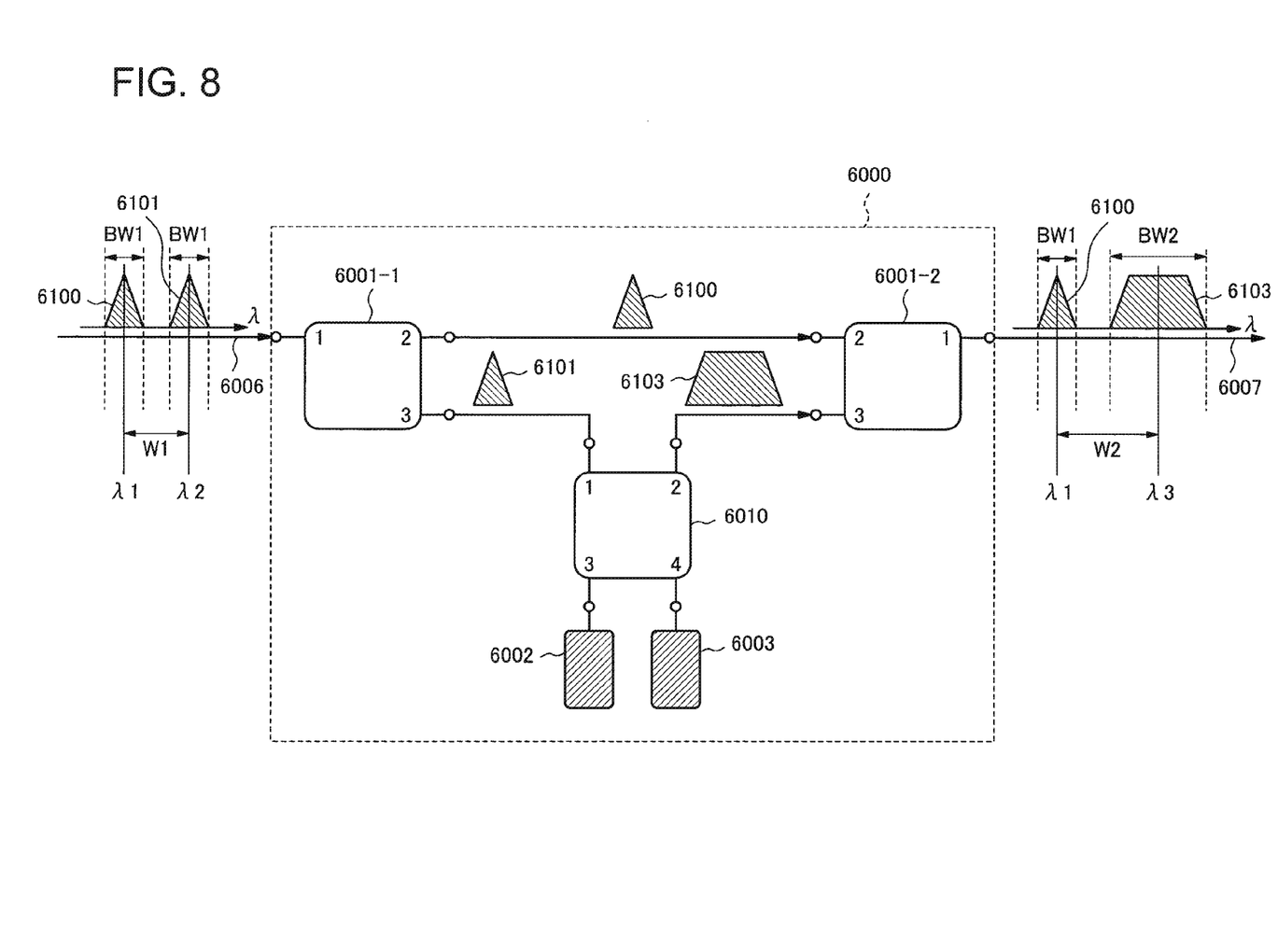
FIG. 8 is a block diagram illustrating a configuration of an optical transmission device in accordance with the sixth exemplary embodiment of the present invention.

Next, the sixth exemplary embodiment of the present invention will be described. FIG. 8 is a block diagram illustrating a configuration of an optical transmission device in the sixth exemplary embodiment of the present invention. The optical transmission device includes the optical switch according to the above-mentioned exemplary embodiments and a wavelength-selective switch.

FIG. 8 illustrates a configuration example of an ROADM (reconfigurable optical add drop multiplexer) 6000 as an optical transmission device using the 4×4 expanded optical switch according to the above-mentioned exemplary embodiments as a transponder aggregator (TPA) 6010.

An optical signal 6100 with its center wavelength equal to λ1 and an optical signal 6101 with its center wavelength equal to λ2 (λ1≠λ2) are inputted into the ROADM 6000. The optical signals 6100 and 6101 are wavelength-multiplexed and optically transmitted through an optical fiber 6006, and then, wavelength-demultiplexing process and switching process are performed in a wavelength-selective switch (WSS) 6001-1. Here, the optical signals 6100 and 6101 have the same wavelength bandwidth BW1. The wavelength interval between λ2 and λ1 is represented by W1, and the condition, that is, W1=λ2−λ1 and W1>BW1, is satisfied.

The optical signal 6100 is guided from the input port 1 to the output port 2 in the WSS 6000-1. On the other hand, the optical signal 6101 is guided from the input port 1 to the output port 3, and then transmitted to the input port 1 of the TPA 6010. The TPA 6010 outputs the inputted optical signal 6101 from the output port 3 and introduces it into a transponder 6002.

An optical signal 6103 output from a transponder 6003 whose center wavelength is equal to λ3 (λ3≠λ2) has a wavelength bandwidth BW2 (BW1≠BW2). Here, the condition, that is, W2=λ3−λ1 and W2>(BW1+BW2)/2, is satisfied. The optical signal 6103 is switched at the TPA 6010 and is guided to the input port 3 of a WSS 6001-2.

On the other hand, the optical signal 6100 guided from the output port 2 of the WSS 6001-1 without any change (cut-through) is wavelength-multiplexed with the optical signal 6103 in the WSS 6001-2 and guided to an optical fiber 6007.

Such configuration makes it possible to replace the optical signal 6101 of the wavelength-multiplexed optical signals 6100 and 6101 having been transmitted through the optical fiber 6006 with the optical signal 6103 in the ROADM 6000, and then, to transmit the optical signal 6103 to the optical fiber 6007. If there is an unused port in the TPA 6010, it is possible to connect an optical signal from an arbitrary input port to an arbitrary output port without conflict over an input port and an input wavelength, without re-configuration, and with non-blocking. That is to say, the ROADM 6000 can operate as an optical node having CDC functions.

The TPA 6010 has no limits in respect of the center wavelength and the wavelength bandwidth. Therefore, the ROADM 6000 according to the present exemplary embodiment can perform a switching operation even though there coexist the optical signals 6100, 6101, and 6013 whose center wavelengths, center wavelength intervals, and wavelength bandwidths are different from each other.

The present invention is not limited to the aforementioned exemplary embodiments. Various modifications can be made therein within the scope of the present invention as defined by the claims, and obviously, such modifications are included in the scope of the present invention.

This application is based upon and claims the benefit of priority from Japanese Patent Application No. 2012-251146, filed on Nov. 15, 2012, the disclosure of which is incorporated herein in its entirety by reference.

REFERENCE SIGNS LIST 100, 200, 1000, 2000, 3000, 4000 Optical switch
110, 211 Unit optical switch
120, 220, 1001, 1002, 1003, 1004 Optical splitter
130, 212 Optical selector
210 Sub optical switch
1011, 1021, 1031, 1041 SS optical switch
1101, 1201, 1301, 1401 Optical selector
2001, 2002, 2003, 2004, 2005, 2006 1×3 Optical splitter
2011, 2021, 2031, 2041, 2051, 2061, 2071, 2081, 2091, 3011, 3021, 4011,
4031 2×2 SS optical switch
2101, 2201, 2301, 2401, 2501, 2601 3×1 Optical selector
20001, 20002, 20003 6×2 Expanded optical switch
3001, 3002, 3003, 3004, 4001, 4002 1×2 Optical splitter
3100 4×2 Sub optical switch
3101, 3201, 4101, 4201, 4301, 4401 2×1 Optical selector
4010 2×4 Sub optical switch
5000 Related cross network connection optical switch
5001, 5002, 5011 to 5041, 5101, 5211 4×4 Optical switch
6000 ROADM
6001-2, 6001-2 WSS
6002, 6003 Transponder
6006, 6007 Optical fiber
6000 TPA
6100, 6101, 6103 Optical signal

What is claimed is:
1. An optical switch, comprising:
a unit optical switch inputting n optical signals and outputting n optical signals;
an optical splitter inputting a single optical signal, splitting the single optical signal into k optical signals, and outputting the k optical signals; and
an optical selector inputting m optical signals and outputting a single optical signal,
wherein the optical splitter comprises m×n pieces,
the unit optical switch comprises m×k pieces,
the optical selector comprises n×k pieces,
(k×(m×n)) outputs of the optical splitter correspond to (n×(m×k)) inputs of the unit optical switch,

(n×(m×k)) outputs of the unit optical switch correspond to (m×(n×k)) inputs of the optical selector, and (n×m) optical signals inputted into the optical splitter are output through the (m×k) unit optical switch from the optical selector as (n×k) optical signals, wherein n represents a natural number more than one, and m and k represent natural numbers, and wherein the unit optical switch is configured to connect switching elements in multiple-stage, and each of the switching elements performs a switching operation by splitting input light into two light beams and selecting split light beams.

2. The optical switch according to claim 1, wherein the number of the unit optical switch is variable.

3. The optical switch according to claim 2, wherein a splitting ratio of the optical splitter is variable.

4. The optical switch according to claim 1, wherein a splitting ratio of the optical splitter is variable.

5. An optical transmission device, comprising:
the optical switch according to claim 1, and
a wavelength-selective switch.

6. The optical switch according to claim 1, wherein a splitting ratio of the optical splitter is variable.

7. An optical switch, comprising:
an optical splitter inputting a single optical signal, splitting the single optical signal into k optical signals, and outputting the k optical signals; and
a sub optical switch inputting (m×n) optical signals and outputting n optical signals,
wherein the optical splitter comprises (m×n) pieces,
the sub optical switch comprises k pieces,
k outputs of one of the optical splitter correspond to each input of k sub optical switch,
(m×n) inputs of one of the sub optical switch correspond to each output from (m×n) optical splitter, and
(n×m) optical signals inputted into the optical splitter are output from the sub optical switch as (n×k) optical signals,
wherein n represents a natural number more than one, and m and k represent natural numbers,
and wherein the optical splitter is configured to connect switching elements in multiple-stage, and each of the switching elements performs a switching operation by splitting input light into two light beams and selecting split light beams.

8. The optical switch according to claim 7,
wherein the sub optical switch comprises
a unit optical switch inputting n optical signals and outputting n optical signals; and
an optical selector inputting m optical signals and outputting one optical signal,
the unit optical switch comprises m pieces,
the optical selector comprises n pieces,
m inputs of one of the optical selector correspond to each output from the m unit optical switch,
n outputs from one of the unit optical switch correspond to each input of n optical selector, and
(m×n) optical signals inputted into the unit optical switch are output from the optical selector as n optical signals.

9. The optical switch according to claim 8,
wherein the number of the unit optical switch is variable.

10. The optical switch according to claim 8,
wherein a splitting ratio of the optical splitter is variable.

11. An optical transmission device, comprising:
the optical switch according to claim 8; and
a wavelength-selective switch.

12. The optical switch according to claim 7,
wherein the number of the sub optical switch is variable.

13. The optical switch according to claim 12,
wherein a splitting ratio of the optical splitter is variable.

14. The optical switch according to claim 7,
wherein a splitting ratio of the optical splitter is variable.

15. An optical transmission device, comprising:
the optical switch according to claim 7; and
a wavelength-selective switch.

* * * * *